(12) United States Patent
Saghier et al.

(10) Patent No.: US 7,082,381 B1
(45) Date of Patent: Jul. 25, 2006

(54) METHOD FOR PERFORMANCE MONITORING AND MODELING

(75) Inventors: Dean Lee Saghier, Olathe, KS (US); Brian Washburn, Kansas City, MO (US); Scott Schroder, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/056,075

(22) Filed: Feb. 11, 2005

Related U.S. Application Data

(60) Division of application No. 10/914,405, filed on Aug. 9, 2004, which is a continuation of application No. 10/706,707, filed on Nov. 12, 2003.

(51) Int. Cl.
*G06F 15/20* (2006.01)

(52) U.S. Cl. .................. 702/182; 702/183; 702/184; 703/21; 703/22; 717/104; 717/124; 709/223; 709/224

(58) Field of Classification Search ............... None
See application file for complete search history.

(56) References Cited

U.S. PATENT DOCUMENTS 5,375,070 A * 12/1994 Hershey et al. ............ 709/224
6,643,613 B1 * 11/2003 McGee et al. ............. 702/186
6,738,933 B1 * 5/2004 Fraenkel et al. ............ 714/47
6,782,421 B1 * 8/2004 Soles et al. ................ 709/223
6,816,798 B1 * 11/2004 Pena-Nieves et al. ........ 702/84
6,898,556 B1 * 5/2005 Smocha et al. ............ 702/186
2003/0202638 A1 * 10/2003 Eringis et al. ........... 379/15.01
2005/0197806 A1 * 9/2005 Eryurek et al. ............ 702/188

\* cited by examiner

*Primary Examiner*—Carol S. W. Tsai (57) ABSTRACT

The present invention provides a method for modeling the performance of a system comprising computer software operating on computer hardware. In accordance with the present invention, system performance is modeled by fitting non-linear curves to data points for system performance parameters, such as response time and throughput, as a function of load. Data points may be measured in testing may be measured through monitoring a system operating in a production environment. While a variety of non-linear curves may be used in accordance with the present invention, a logarithmic curve may be used to model system throughput and an exponential curve may be used to model system response time. By defining a relationship between throughput and response time a distance may be calculated between the curves, and this distance may be used to determine an optimal load. Additionally, a graph displaying both throughput and response time as a function of load may be displayed to a system operator in a graphical user interface to facilitate the evaluation of system performance.

10 Claims, 11 Drawing Sheets

METHOD FOR PERFORMANCE MONITORING AND MODELING

CROSS-REFERENCE TO RELATED APPLICATIONS

This application is a divisional of U.S. application Ser. No. 10/914,405 filed Aug. 9, 2004, now pending, entitled SYSTEM AND METHOD FOR MONITORING AND MODELING SYSTEM PERFORMANCE, which is a continuation of U.S. application Ser. No. 10/706,707 filed Nov. 12, 2003, now pending, entitled METHOD FOR MODELING SYSTEM PERFORMANCE.

STATEMENT REGARDING FEDERALLY SPONSORED RESEARCH OR DEVELOPMENT

None.

TECHNICAL FIELD

The present invention relates to the modeling of systems comprising computer software operating on computer hardware. More particularly, the present invention relates to real-time collection of system metrics and the systems and methods for the modeling of system performance parameters as non-linear functions for use in predicting system performance, identifying circumstances at which system performance will become unacceptable, and issuing alarms when system performance is near or beyond unacceptable conditions.

BACKGROUND OF THE INVENTION

Computing systems have become an integral part of business, government, and most other aspects of modern life. Most people are likely regrettably familiar with poor performing computer systems. A poor performing computer system may be simply poorly designed and, therefore, fundamentality incapable of performing well. Even well-designed systems will perform poorly, however, if adequate resources to meet the demands placed upon the system are not available. Properly matching the resources available to a system with the demand placed upon the system requires both accurate capacity planning and adequate system testing to predict the resources that will be necessary for the system to function properly at the loads expected for the system.

Predicting the load that will be placed upon a system may involve a number of issues, and this prediction may be performed in a variety of ways. For example, future load on a system may be predicted using data describing the historical change in the demand for the system. Such data may be collected by monitoring a system or its predecessor, although such historical data may not always be available, particularly for an entirely new system. Other methods, such as incorporating planned marketing efforts or other future events known to be likely to occur, may also be used. The way in which system load is predicted is immaterial to the present invention.

Regardless how a prediction of future system load is made, a system must have adequate resources to meet that demand if the system is to perform properly. Determining what amount of resources are required to meet a given system demand may also be a complex problem. Those skilled in the art will realize that system testing may be performed, often before a system is deployed, to determine how the system will perform under a variety of loads. System testing may allow system managers to identify the load at which system performance becomes unacceptable, which may coincide with a load at which system performance becomes highly nonlinear. One skilled in the art will also appreciate that such testing can be an enormously complex and expensive proposition, and will further realize that such testing often does not provide accurate information as to at what load a system's performance will deteriorate. One reason for the expense and difficulty of testing is the large number of tests necessary to obtain a reasonably accurate model of system performance.

One skilled in the art will likely be familiar with the modeling of a system's performance as a linear function of load. One skilled in the art will further realize, however, that a linear model of system performance as a function of load is often a sufficiently accurate depiction of system performance within only a certain range of loads, with the range of loads within which system performance is substantially linear varying for different systems. System performance often becomes non-linear at some point as the load on the system increases. The point at which system performance becomes nonlinear may be referred to as the point at which the linear model breaks down. The load at which a system's performance begins to degrade in a non-linear fashion may be referred to as the knee. At the knee, system throughput increases more slowly while response time increases more quickly. At this point system performance suffers severely, but identifying the knee in testing can be difficult. Accordingly, while a basic linear model theoretically can be obtained with as little as two data points, additional data points are necessary to determine when a linear model of system performance will break down. Obtaining sufficient data points to determine when a linear model of system performance breaks down often requires extensive testing. At the same time, such testing may not yield an accurate model of system performance, particularly as the system moves beyond a load range in which its performance is substantially linear.

The collection of system metrics in a production environment may be used to monitor system performance. System metrics collected in a production environment may also be used to model system performance. However, linear modeling of system performance using system metrics collected in a production environment will not e likely to yield a better prediction of the system's knee unless the system operates at or beyond that point. Of course, one skilled in the art will appreciate that the purpose of system testing and system modeling is to avoid system operation at and beyond the knee, meaning that if such data is available the modeling and monitoring has already substantially failed.

A further challenge to using system metrics collected in a production environment is the burden of collecting the metrics. Simply put, collecting system metrics consumes resources. The system to be monitored, and/or associated systems operating with it, must measure, record, and process metrics. Particularly when a system is already facing a shortage of resources, the increased cost of monitoring the system's metrics must occur in an efficient fashion and provide significant benefit to be justified.

SUMMARY OF THE INVENTION

The present invention provides systems and methods to collect metrics from a system operating in a production environment. The collected metrics may be used as a plurality of data points to model system performance by fitting a non-linear curve to the data points. The use of a non-linear curve may better identify the load at which a system's operation will become unacceptable. Systems and methods in accordance with the present invention may also identify correlations between measured system metrics, which may be used to develop further models of system performance. The present invention may also be utilized to identify a point of interest in system performance for use in monitoring a system in a production environment so that an alarm may issue if system performance exceeds predetermined parameters around the point of interest.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides systems and methods for monitoring system performance, identifying correlations between system metrics, modeling system performance, identifying acceptable operating parameters, and issuing alarms if acceptable operating parameters are exceeded, wherein a system comprises computer software operating on computer hardware. The present invention may be used in conjunction with a system comprising any computer software operating on any computer hardware. One example of such a system is an order processing system that receives orders input into a user interface, processes that information, and then provides pertinent information to persons or systems responsible for filling the orders. However, any system comprising software operating on hardware may be monitored and/or modeled using systems and methods in accordance with the present invention. In systems and methods in accordance with the present invention, system metrics may be measured and used to model system performance. For example, data points for system throughput may be obtained at a plurality of loads, and system performance may then be modeled by fitting a non-linear curve to the data points to obtain a non-linear model of system throughput as a function of load. One skilled in the art will appreciate that the data points used in accordance with the present invention to model system performance may be obtained in a variety of ways. By way of example, data points may be obtained through system testing or through monitoring system performance while the system is in use. A system that is in use may be described as being in a production environment. One skilled in the art will appreciate that numerous methods, procedures, techniques, and protocols exist or may be developed for system testing, and that any of these may be used in system testing to obtain data points for use in accordance with the present invention. Likewise, one skilled in the art will appreciate that a variety of methods, procedures, techniques, and protocols exist or may be developed for system monitoring in addition to those described herein, and that any of these may be used to monitor a system operating in its production environment to obtain data points for use in accordance with the system modeling aspects of the present invention.

In the examples described herein for FIG. 1 through FIG. 6B, the system performance parameters measured and modeled are response time and throughput as a function of load. One skilled in the art will appreciate that other network performance parameters may also be modeled using methods in accordance with the present invention. Response time may be measured as the time required for a system request to be processed, throughput may be measured as the number of system requests processed in a given period of time, and load may be defined as the total number of system users, although one skilled in the art will realize that these parameters may be defined in a number of other ways.

Figure 1:
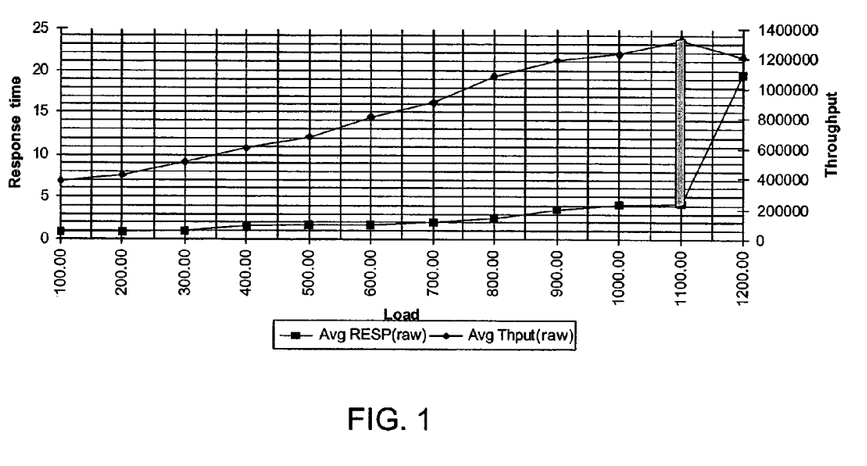
FIG. 1 is a graph illustrating test data points of system response time and throughput as a function of load.

FIG. 1 illustrates a graph depicting system performance data points at a variety of loads. FIG. 1 illustrates system response time and system throughput as a function of load on a single graph. As can be seen in FIG. 1, twelve data points were collected through testing for both response time and throughput. Solid lines connect collected data points, although no attempt has been made to fit a curve, either linear or nonlinear, to the data points in FIG. 1. In FIG. 1, response time is illustrated on the left vertical axis in units of seconds, throughput is illustrated on the right vertical axis in units of requests processed, and system load is illustrated on the horizontal axis in units of total users. As illustrated in FIG. 1, twelve data points were required to illustrate where system performance became extremely non-linear. As can be seen in FIG. 1, this knee occurs at a load of 1,100 users. It should be realized that FIG. 1 illustrates only a comparatively small set of data points. In actual practice, considerably more data points, and correspondingly more testing, may be required to satisfactorily forecast system performance and to identify the load at which system performance becomes non-linear and the load at which system performance will become unacceptable.

Figure 2:
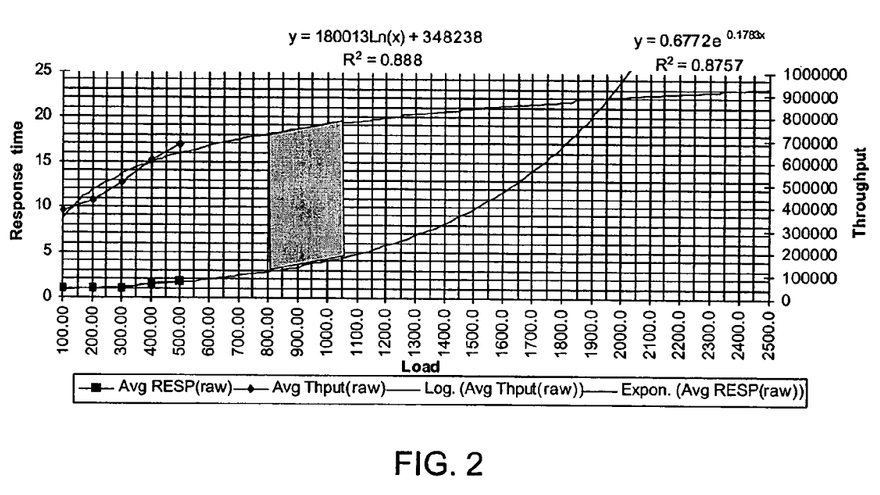
FIG. 2 is a graph illustrating non-linear curves using five test data points as a baseline of response time and throughput as a function of load.

Referring now to FIG. 2, non-linear curves are illustrated that have been fit to data points for response time and throughput as a function of load. The system modeled in FIG. 2 is the same as the system for which system performance is illustrated in FIG. 1. As can be seen in FIG. 2, only five response time data points and five throughput data points were used to model the non-linear curves. In FIG. 2, response time was modeled by fitting an exponential curve to the response time data points, while the throughput behavior was modeled by fitting a logarithmic curve to the throughput data points. As illustrated in FIG. 2, throughput was modeled as y=180013Ln(x)+348238 and response time was modeled as y=0.6772e$^{0.1783x}$, where x denotes system load. The numerical values in these equations may be determined using curve fitting techniques well known in the art that regressively fit a curve to data points by adjusting the constants of the equation until an optimal fit to the available data points is obtained. As illustrated in FIG. 2, the $R^2$ value, which is a measure of the quality of the fit of the curve to the data points, is reasonably high for each curve, being $R^2$=0.888 for response time and $R^2$=0.8757 for throughput. One skilled in the art will appreciate that any method for fitting a curve to collected data points may be used in this process. One skilled in the art will further realize that non-linear curves other than exponential and logarithmic curves may be used if the performance parameter being modeled performs in a manner that lends itself to a different mathematical model. A range in which the distance between the throughput and response time curves is maximized is illustrated by shading in FIG. 2. This range extends from a load of 800 users to a load of 1,050 users. As a load exceeds the optimal range, system performance may be compromised. The optimal range illustrated in FIG. 2 is obtained by identifying the load at which the distance between the response time and throughput curves is greatest. A range of loads may be defined around this identified optimal load in a variety of ways. For example, the optimal range may be defined as the range of loads at which the distance between the curves remains at a predetermined percentage of the maximum distance. Alternatively, the optimal range may be defined as a specific load range around the optimal load, however, such a definition may prove problematic in a rapidly changing system. In comparing FIG. 1 and FIG. 2, it should be noted that FIG. 2 utilizes less than half the data points utilized in FIG. 1. It should be further realized that while the non-linear curves modeled in FIG. 2 do not exactly match the lines connecting data points in FIG. 1, the optimal range identified using the curves in FIG. 2 identifies a maximum load very close to the load at which system response time and system throughput begins to behave in a highly non-linear fashion in FIG. 1. One skilled in the art will further realize that if considerably more data points were obtained in addition to those illustrated in FIG. 1, the resulting graph may likely even more closely resemble the models illustrated in FIG. 2.

Figure 3:
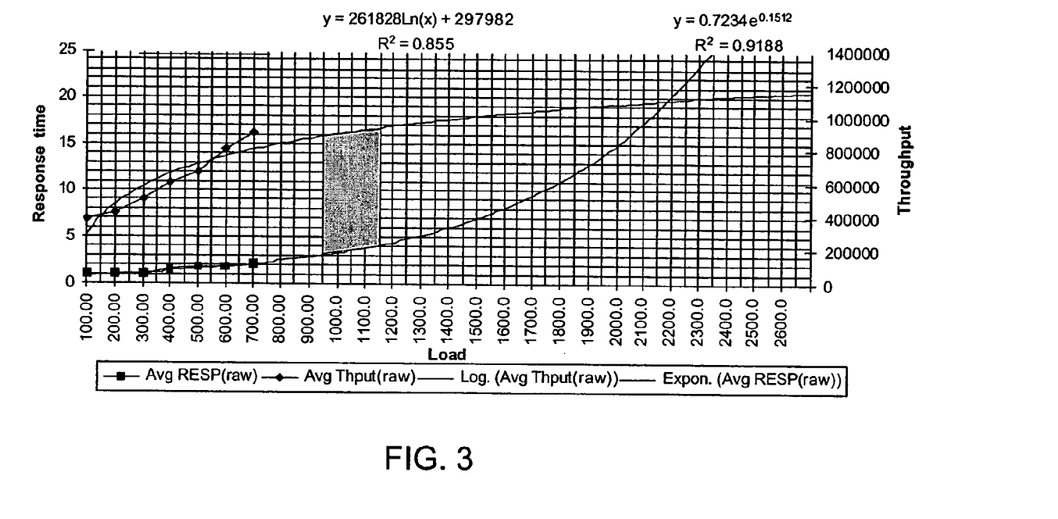
FIG. 3 is a graph illustrating non-linear curves using seven test data points as a baseline of response time and throughput as a function of load.

Referring now to FIG. 3 a model of system performance based upon seven data points is illustrated. The system whose performance was modeled in FIG. 2. The curves fit to the data points in FIG. 3 are, for system throughput, y=261828Ln(x)+297982, which provides an $R^2$ value of $R^2$=0.855, and for system response time, y=0.7234e$^{0.1512x}$, with an $R^2$ value of $R^2$=0.9188. As in FIG. 2, the optimal range determined in FIG. 3 is illustrated using a shaded rectangle. The optimal range determined in the model illustrated in FIG. 3 is a load of 950 users to 1,150 users. It should be noted that the optimal range determined in FIG. 3 using additional data points to fit the curves resembles the optimal range obtained in FIG. 2.

Figure 4:
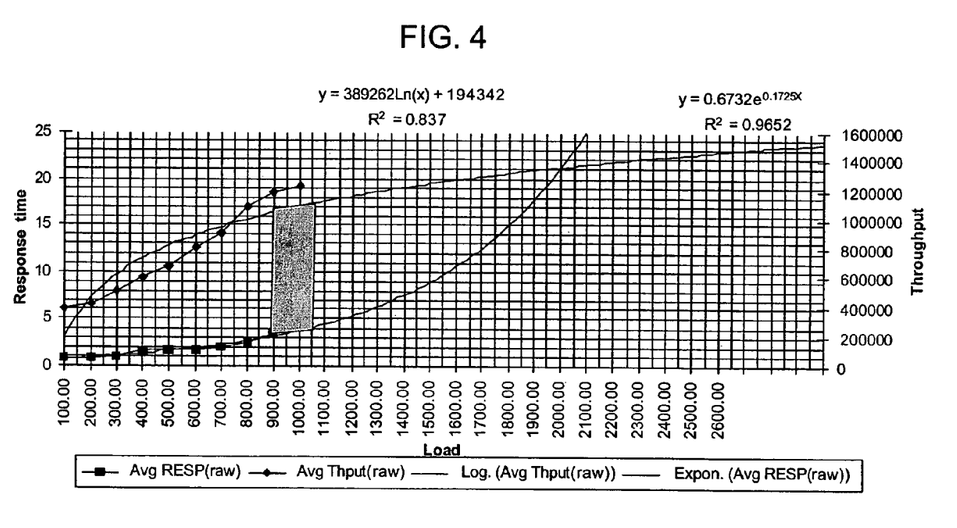
FIG. 4 is a graph illustrating non-linear curves using ten test data points as a baseline of response time and throughput as a function of load.

Referring now to FIG. 4 a model of system performance based upon ten data points is illustrated. The system modeled in FIG. 4 is the same system that was modeled in FIG. 2 and FIG. 3 is illustrated as modeled using ten data points. In modeling system throughput using a curve fit to the data points, the curve fit to the system throughput data points in FIG. 4 is y=389262Ln(x)+194342, which has a $R^2$ value of $R^2$=0.837. In fitting an exponential curve to the system response data points, the equation fit to the data points in FIG. 4 is y=0.6732e$^{0.1725x}$, with $R^2$ value of $R^2$=0.9652. The optimal range determined using the model illustrated in FIG. 4 is illustrated with a shaded rectangle. The optimal range determined based upon the model illustrated in FIG. 4 is from a load of 900 users to a load of 1,050 users. Once again, it should be noted that the optimal range determined in FIG. 4 corresponds well with the optimal range in FIG. 1, FIG. 2 and FIG. 3.

One skilled in the art will appreciate that a relationship between units of response time and units of throughput were defined to enable response time and throughput to be illustrated on a single graph in FIGS. 1–4, as well as to allow a distance between the curves to be defined. One skilled in the art will appreciate that the precise relationship between throughput and response time vary depending upon the system in question and the units used to measure throughput and response time, or whatever other network operation parameters are measured and modeled.

Graphs such as the graph illustrated in FIG. 2 may be particularly useful in accordance with the present invention to visually represent a model of system behavior to a user. The relationship between response time and throughput may also be defined mathematically, for example based upon the distance between the two curves. In this case, the distance may be defined as the value of the throughput curve at a given load minus the value of the response time curve at the same load. The load at which this distance is maximized may be thought of as the optimal system load. It should be noted, however, that an optimal system load may be defined in a variety of ways, some of which are described below in connection with examples of methods in accordance with the present invention. A range around such an optimal system load may be identified as the optimal operating range for a system. This range may be determined, for example, as the range of loads over which the distance between the curves is a given portion, such as ninety percent, of the maximum distance. A system may be monitored and, if its load or the other measured system operating parameters exceed the optimal range, an alarm may be issued so that system operators may take appropriate steps to bring additional resources to the system or to otherwise improve system performance before system performance. Alternatively, the methods in accordance herein may be used to identify a load at which a particular parameter, such as system response time, will cease to be acceptable, and then issue an alarm when that load is reached. Likewise, in some systems other parameters, such as throughput or response time, rather than load, may be monitored with alarms being issued whenever certain threshold values are reached.

Figure 5:
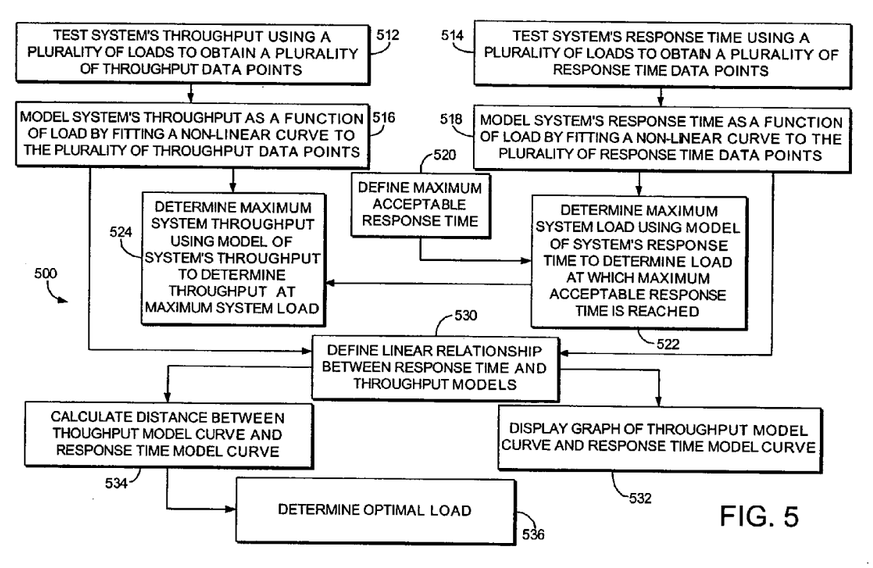
FIG. 5 illustrates a method in accordance with the present invention for modeling system performance in a testing environment.

Referring now to FIG. 5, a method 500 for modeling system performance is illustrated. While method 500 illustrates a method in accordance with the present invention for modeling system response time and throughput, methods in accordance with the present invention may be used to model other network parameters. In step 512 the system's throughput may be tested using a plurality of loads to obtain a plurality of throughput data points. Any testing procedure may be used in step 512. The throughput data points obtained in step 512 are utilized in step 516 to model the system's throughput as a function of load by fitting a non-linear curve to the plurality of throughput data points. It should be appreciated that the type of non-linear curve fit to the throughput data points may vary, but may appropriately comprise a logarithmic curve. It should further be appreciated that a variety of methods may be used to fit a non-linear curve to the throughput data points. Furthermore, the number of throughput data points used to fit a curve may vary. For example, a very small number of data points, such as three, may be used in fitting a non-linear curve. Alternatively, a larger number, such as ten as illustrated in FIG. 4, or more may be used to fit a non-linear curve. One skilled in the art will realize that as the number of throughput data points increases the resulting curve will likely better model actual system performance and that a compromise between accuracy of modeling and expense of testing must sometimes be reached. However, methods in accordance with the present invention permit a more favorable compromise to be reached, in that an acceptably accurate model may be achieved using relatively few data points.

In step 514 the system's response time may be tested using a plurality of loads to obtain a plurality of response time data points. Any testing procedure may be used in step 514. Step 514 may be performed in conjunction with step 512, although these steps may also be performed separately. The response time data points obtained in step 514 are utilized in step 518 to model the system's response time as a function of load by fitting a non-linear curve to the plurality of response time data points. It should be appreciated that the type of non-linear curve fit to the response time data points may vary, but may appropriately comprise an exponential curve. It should be further appreciated that a variety of methods may be used to fit a non-linear curve to the response time data points. Alternatively, a larger number of data points, such as five, or seven as illustrated in FIG. 2, or more may also be used to fit a non-linear curve. One skilled in the art will realize that as the number of response time data points increases the resulting curve will likely better model actual system performance and that a compromise between accuracy of modeling and expense of testing must sometimes be reached. However, methods in accordance with the present invention permit a more favorable compromise to be reached, in that an acceptably accurate model may be achieved using relatively few data points.

In step 520 a maximum acceptable response time may be defined. For example, users of the system may determine that a response time greater than a given predetermined amount, such as five seconds, is unacceptable. Thus, in this example, the maximum acceptable response time would be five seconds. Using the non-linear curve modeling the system's response time as a function of load, step 522 may determine the maximum system load as the load at which the maximum acceptable response time is reached. Step 524 may then determine the maximum system throughput using the model of the system's throughput to determine the throughput for the system at the maximum load. Step 520, step 322, and step 524 allow a system's operator to obtain information regarding the maximum capabilities of the system in operation. However, one or more of step 520, step 522, and step 524 may be omitted from methods in accordance with the present invention.

In step 530 a linear relationship may be defined between response time and throughput. This definition in step 530 may be used in step 532 of displaying a graph of the throughput model curve and the response time model curve in a single graph. If step 530 is omitted, step 532, if performed may display multiple graphs.

Step 530 may further permit step 534 of calculating the distance between the throughput model curve and the response time model curve. This distance may be monitored in system operation and an alarm may be issued if the distance falls below a threshold amount. The distance calculated in step 534 may be used in step 536 to determine the optimal load for the system. For example, the optimal load may be the load at which the distance between the curves is maximized. Optimal load may be defined in other ways, as well, such as the load at which a desired throughput or response time is attained or the load of which system utilization is reached. An optimal range may be defined around the optimal load for use in monitoring system performance and issuing an alarm should system performance exceed the optimal range.

Figure 6A:
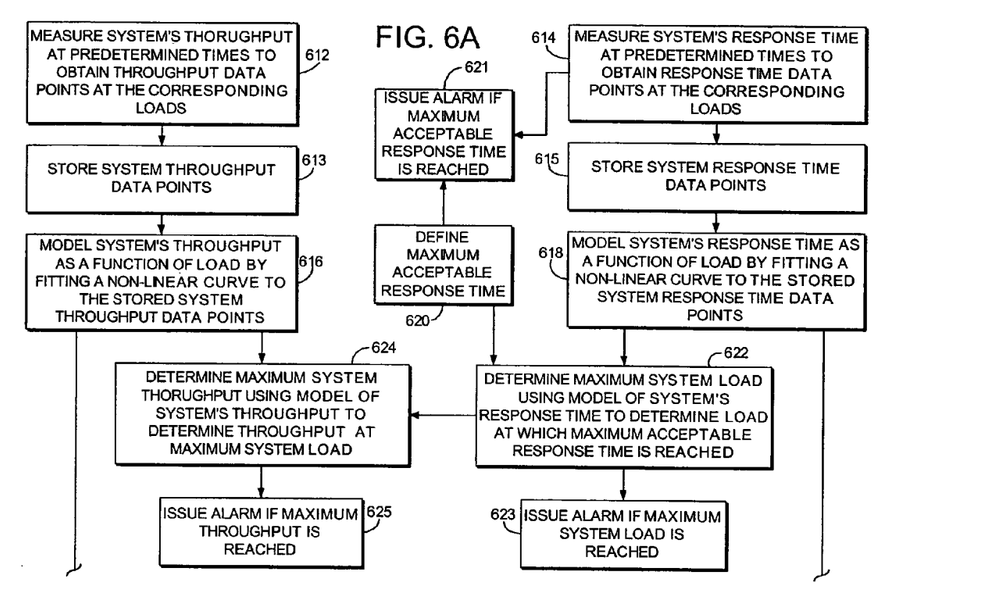
FIG. 6A and FIG. 6B illustrate a method in accordance with the present invention for modeling system performance in a production environment.
Figure 6B:
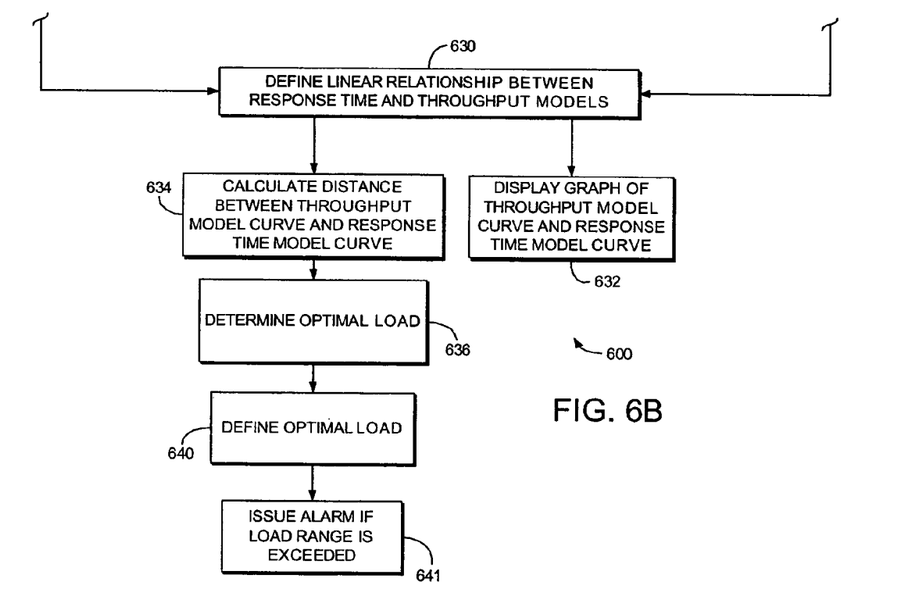

Referring now to FIG. 6, an alternative method 600 in accordance with the present invention is illustrated. While method 600 illustrates a method in accordance with the present invention for modeling system response time and throughput, methods in accordance with the present invention may be used to model other network parameters. Method 600 may be particularly suitable for modeling the performance of a system already functioning in a production environment. In step 612 the system's throughput is measured at predetermined times to obtain throughput data points at the loads existing at the measurement times. The predetermined times at which measurements are taken according to step 612 may appropriately vary from system to system. For example, measurements could be made on a daily, hourly, weekly, or other basis. Measurements could also be made after a predetermined number of system processes. In step 613 the throughput data points may be stored. Step 613 may store the throughput data points to a hard drive, in computer memory, or in any other fashion. In step 616 the throughput data points may be used to model the system's throughput as a function of load by fitting a non-linear curve to the stored system throughput data points. It should be noted that a variety of non-linear curves may be used, such as a logarithmic curve. One skilled in the art will realize that a variety of curve-fitting methodologies may be used. It should be further noted that step 616 may be performed at a variety of times. For example, step 616 may be performed at predetermined times, such as on a daily or weekly basis. Alternatively, step 616 may be performed every time a predetermined number of new throughput data points have been stored in step 613. For example, step 616 may be performed one, ten, on hundred, or some other number of new data points have been stored in step 613. Whatever timing is used to perform step 616, it may be expected that as additional throughput data points are added the curve modeled in step 616 will increasingly and accurately reflect system throughput as a function of load. Step 616 may use every stored throughput data point, or it may use a subset of stored throughput data points, such as the data points for the last week of operation.

In step 614 the system's response time is measured at predetermined times to obtain response time at the loads existing at the measurement times. As with step 612, step 614 may be performed at a variety of times, such as on a daily, hourly, weekly, or other basis as appropriate for the system in question. In step 615 the response time data points may be stored. Step 615 may store the response time data points to a hard drive, in computer memory, or in any other fashion. In step 618 the response time data points may be used to model the system's response time as a function of load by fitting a non-linear curve to the stored system response data points. It should be noted that a variety of non-linear curves may be used, such as an exponential curve. One skilled in the art will realize that a variety of curve fitting methodologies may be used. It should be further noted that step 618 may be performed at a variety of times. For example, step 618 may be performed at predetermined times, such as on a daily or weekly basis. Alternatively, step 618 may be performed every time a predetermined number of new response time data points have been stored in step 615. Fore example, step 618 may be performed when one, ten, one hundred, or some other number of new data points have been stored in step 615. Whatever timing is used to perform step 616, it may be expected that as additional response time data points are added the curve modeled in step 618 will increasingly and accurately reflect system response time as a function of load. Step 618 may use every stored response time data point, or it may use a subset of stored response time data points, such as the data points for the last week of operation.

In step 620 a maximum acceptable response time may be defined. The maximum acceptable response time may be a predetermined amount of time within which a response must be made by the system for system performance to be deemed acceptable. For example, a maximum acceptable response time of five seconds may be used. If system response time is being monitored step 621 may issue an alarm if the maximum acceptable response time is reached or exceeded. Such an alarm may indicate that the system requires additional resources or adjustments to function properly. Alternatively, step 621 may issue an alarm when response time reaches a predetermined percentage of the maximum acceptable response time, such as, for example, eighty percent.

Based upon the maximum acceptable response time defined in step 620 and the model of the system's response time as a function of load created in step 618, step 622 may determine the maximum system load as the load at which the maximum acceptable response time is reached. In step 623 an alarm may be issued if the maximum system load is reached. Alternatively, step 623 may issue an alarm if a predetermined percentage of the maximum system load is reached, such as, for example, eighty percent. In step 624 the maximum system load determined in step 622 and the model of the system's throughput as a function load created in step 616 may be used to determine the maximum system throughput as the throughput at the maximum system load. In step 625 an alarm may be issued if the maximum acceptable response time is reached. Alternatively, step 625 may issue an alarm if a predetermined percentage of the maximum throughput is reached, for example eighty percent.

In step 630 a relationship may be defined between response time and throughput. The relationship defined in step 630 may be a linear relationship. In step 632 a graph may be displayed of the throughput model curve and the response time model curve. Step 632 may display both curves in a single graph through a graphical user interface. If step 630 is omitted, step 432 may display the curves in multiple graphs.

The relationship between throughput and response time defined in step 630 may also be used to calculate a distance between the throughput model curve and the response time model curve in step 634. Using distance as calculated in step 634, step 636 may determine an optimal load as the load at which the distance between the curves is maximized. Optimal load may be defined in other ways, as well, such as the load at which a desired throughput or response time is attained or the load at which a given system utilization is reached. Step 640 may define an optimal load range around the optimal load. In step 641 an alarm may be issued if the optimal load range defined in step 640 is exceeded.

Of course, methods in accordance with the present invention, such as method 500 and method 600, may be used to model network parameters other than system throughput and system response time. Methods in accordance with the present invention may be used to measure a first network parameter, model the first network parameter as a non-linear curve, measure a second network parameter, and model the second network parameter as a non-linear curve. Measuring the first network parameter and the second network parameter may comprise testing the system, measuring the network parameters during system operation, or a combination thereof. A relationship may be defined between the first network parameter and the second network parameter. Such a relationship may allow a distance to be determined between the curve modeling the first network parameter and the curve modeling the second network parameter. Such a relationship may also allow the display of the curve modeling the first network parameter and the curve modeling the second network parameter on a single graph.

It should be appreciated that example method 300 and example method 400 are exemplary methods in accordance with the present invention, and that many steps discussed therein may be omitted, while additional steps may be added. The methods in accordance with the present invention are not limited to any particular way of obtaining data points, whether through testing or monitoring a system in a production environment, nor are they limited to any particular method for fitting a non-linear curve to the data points obtained.

Figure 7:
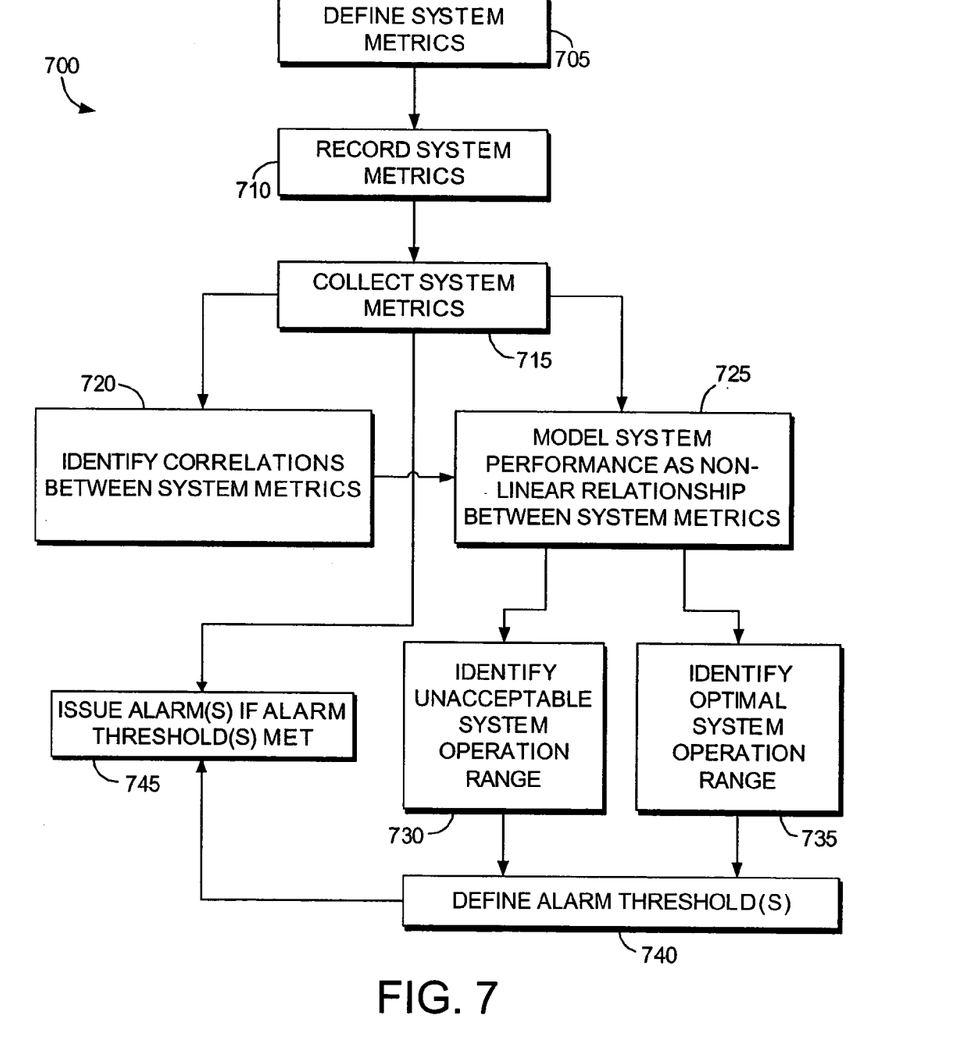
FIG. 7 illustrates a plurality of systems connected together in a network.

Referring now to FIG. 7, a plurality of systems are illustrated showing them connected together in a network 700. System 710 can be a computer, server, order processor, or any other device contained within the network. The present invention, depicted in FIG. 7, shows a number of systems connected together in the network. The present invention applies to any network size. As depicted by servers 720, 730, and 740, the network size can vary depending on the desired need. One skilled in the art can appreciate the magnitude of having a plurality of systems in a network spread across a large distance and needing the manpower and labor to monitor those systems or to service those systems on a continual basis. Within the network, alarms and metrics can be triggered and logged so that proper performance of the system can be maintained or proper performance of a particular application can be maintained. A plurality of devices such as monitors 750, servers 760, telephones 770, audible devices 780 or any other personal notification mechanism 790 can receive notifications of any alarming condition to allow one to correct the alarming condition. Such notification can be used to make improvements to the applications, systems, or network. An alarming condition can be triggered by exceeding the response time, exceeding the maximum throughput, or exceeding the maximum load on the system. Although the systems can come from different vendors, this invention allows for those systems to be integrated together in a network for the opportunity of collecting metrics. The metrics are collected on the systems and are kept on the systems until such time processes transport those metrics to a database 795. Once in the database 795, the metrics are used to model the system's performance as depicted in FIGS. 1, 2, 3, and 4.

Figure 8:
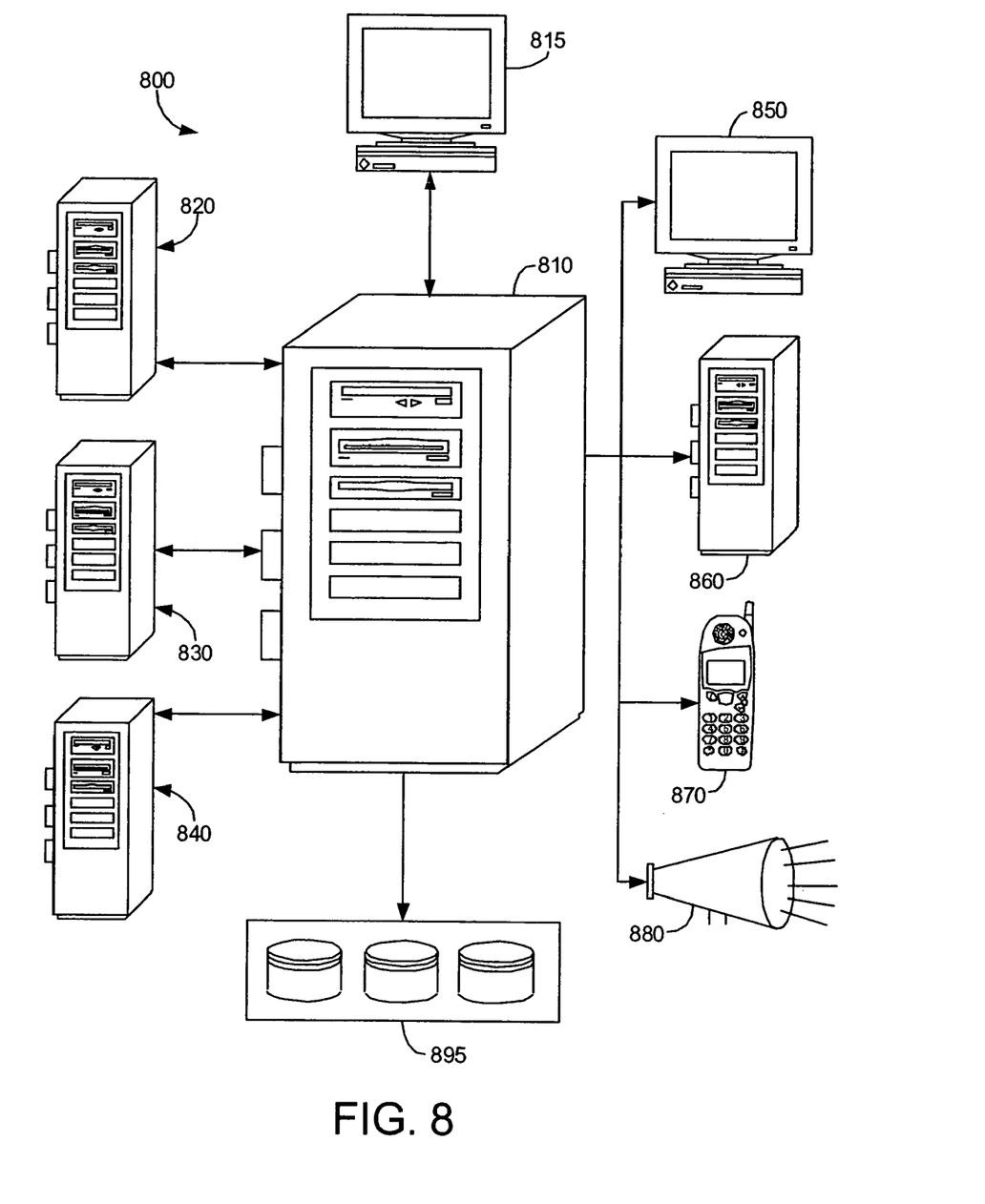
FIG. 8 illustrates processes for collecting metrics which correspond to data points as a baseline of response time and throughput as a function of load.

Referring now to FIG. 8, several processes are illustrated to show the components involved in collecting metrics. FIG. 8 depicts processes that allow for alarms and metrics to be triggered and logged so that proper performance of the system can be maintained or the proper performance of an application can be maintained. FIG. 8 illustrates how data points (also referred to as metrics) are captured to enable the creation of the graphs depicted in FIGS. 1, 2, 3 and 4. The inventor developed computer software programs to operate on a plurality of systems. FIG. 8 shows only one system 810 as a representation of the plurality of systems containing at least one of the same processes.

The first step in the invention is to build a logadaptor process 820. The logadaptor process 820 creates a set of files to reside on the plurality of systems. These files are used to collect metrics and hold threshold data. The logadaptor process 820 may be built through a set of initialization steps and may run on the system 710. Subsequently, it is replicated onto the rest of the systems throughout the network where it runs independently on those systems. Essentially, one can have one logadapter process 820 running on each system 710 in the network. The logadaptor process 820 can run on all of the systems or can run on a select number of systems. The logadaptor process 820 can be replicated onto other systems via such devices such as a chron process or a daemon process.

The logadaptor process 820 takes inputs 830 from a user to set up the initial conditions for the types of applications or systems to be monitored and the types of metrics to be collected. As the logadaptor process 820 begins to run on the plurality of systems, it will automatically generate configuration files 840 pertaining to threshold data and alarm data to run on a particular system. The logadaptor process 820 may perform this function in two ways: It can monitor applications on the system on which it is running, or it can monitor applications on remote systems. Once the configuration files 840 are generated automatically, the configuration files 840 initiate the function for collecting metrics data. The logadapter process 820 stores the metric data in files 850 which subsequently get transferred to a database 880 (same as 795).

Figure 10:
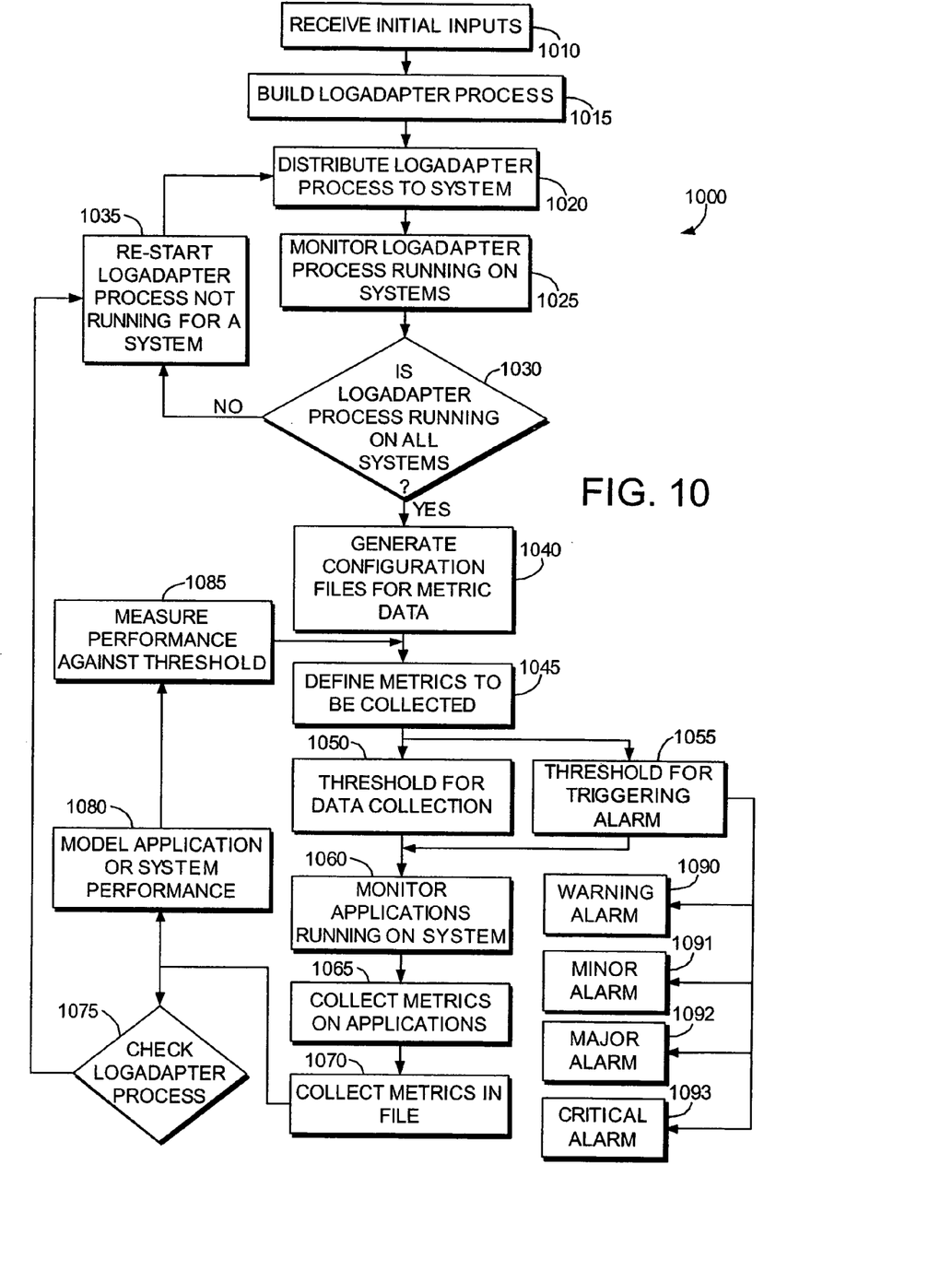
FIG. 10 illustrates a method in accordance with the present invention for collecting metrics using a logadapter process.

Referring to FIG. 10, a method in accordance with the present invention for collecting and alarming metrics in either a testing or production environment is illustrated. To start the method, a user or system may provide initial inputs 1010 to establish the initialization sequences needed for the software. With the initial inputs 1010, the software program builds a logadapter process 1015 running on the system 710. The logadapter process 820 gets distributed to at least one of the systems 820. As a software program, the logadapter process 820 runs on the system 710 but is susceptible to external faults that may prevent it from running successfully. The method of the primary invention monitors the logadapter process running on systems 1025 and checks to determine if the logadapter process is running 1030. If the logadapter process 820 is not running, it is restarted 1035. If the logadapter process 820 is running then the method generates configuration files for metric data 1040. The method of the primary invention defines the metrics to be collected 1045 based on the received initial inputs 1010 and the configuration files 840. With this information a set of thresholds for data collection 1050 and thresholds for triggering alarms 1055 are enabled. Upon the happening of an event, metric data may simultaneously trigger an alarm and get collected. A plurality of alarms as depicted in 1090, 1091, 1092, and 1093 can occur. The software program executes in a manner for the method to continue executing in a loop. The method takes all of the previously mentioned information and monitors applications running on the systems 1060. It collects metrics on the applications 1065 and places the data in files 1070. The method checks the logadapter process 1075 to determine if it is running and the procedure starts again on a continuous basis.

It should be further realized that a variety of actions may be taken if an alarm is issued in accordance with the present invention for a system in a production environment. Additional computing resources may be added, such as additional servers or additional system memory, the software of the system may be improved and modified to enhance efficiency, or some combination of the two may be taken. Alternatively, steps may be taken to reduce load on the system to facilitate better system performance. The steps taken by a system operator due to information obtained in practicing methods in accordance with the present invention are immaterial.

Referring now to FIG. 7, a method 700 for monitoring and modeling system performance in a production environment is illustrated. System metrics are defined in step 705. Any measurable system metric may be defined in step 705, and one skilled in the art will appreciate that different system metrics may be appropriate for different systems. Defining step 705 may be performed automatically using, for example, system monitoring software, or may be performed by one or more personnel entering metric definitions to be received by system monitoring software. In step 710 system metrics are measured and recorded. Step 710 may be performed in a variety of ways. For example, a system to be monitored may periodically measure and record metrics associated with that system and maintain it on storage media associated with that system for later collection and/or analysis. One skilled in the art will be familiar with the use of monitoring software that operates on a functioning system to periodically record system metrics. Step 710 may also be performed external to the system to be monitored. In step 715 system metrics are collected. Collecting step 715 and step 710 may be combined, particularly if recording step 710 occurs external to the system to be monitored. If step 710 occurs on the storage media of the system to be monitored, collecting step 715 may occur less frequently than recording step 710. For example, recording step 710 may occur hourly, while collection step 715 may occur once daily. Collection step 715 may serve to transport metric data to an external system for analysis and modeling. One skilled in the art will appreciate that collection step 715 may be advantageously scheduled to occur during times, such as overnight, when system and bandwidth resources are not in high demand. Collected metric data may be stored in a database for subsequent processing at a central processing hub. A central processing hub may be any computing device, such as a server, that receives measured system metrics and performs an analysis upon those metrics.

The system metric data may be analyzed to identify correlations between the system metrics in identification step 720. Step 720 may be performed at a central processing hub. Identification step 720 may be particularly advantageous when a large number of metrics are measured, not all of which have known correlations between them. In identification step 720 various metrics data may be analyzed over a given period of time to determine whether a mathematical relationship exists between a pair of metrics, such as system load and processor utilization. The identification of correlations between system metrics may then be used to provide more accurate models of system performance. Step 720 may identify pairs of metrics having an identified correlation between them. For example, a primary pair of system metrics may comprise a first system metric and a second metric having a correlation between them. By way of further example, a secondary pair of system metrics may comprise a third system metric and a fourth system metric. There may be metrics common between, for example, a primary pair of system metrics and a secondary pair of system metrics, such that the primary pair of system metrics comprises a first system metric and a second system metric and the secondary pair of system metrics comprises a third system metric and the second system metric. Also, a correlation may be identified, for example, between the first system metric and the third system metric in this example.

One skilled in the art will appreciate that any number of pairs of any number of system metrics having correlation between them and that the designation of a pair as primary, secondary, tertiary, etc. and that the designation of a metric as first, second, third etc. are immaterial to the present invention.

Step 720 may alternatively identify system metrics having a correlation with a predetermined system metric. In many uses, a system metric such as system load may be the predetermined system metric with which other system metrics are analyzed for correlations, although system metrics are analyzed for correlations, although any system metric maybe used for this purpose.

In step 725 system performance is modeled as a nonlinear relationship between system metrics. The model constructed in modeling step 725 may utilize correlations identified in identification step 720 or may use predetermined metrics identified by a system administrator or others through prior experience.

In step 730 unacceptable system operation ranges may be identified. For example, a model constructed in modeling step 725 may indicate that a certain monitored system metric, such as system response time, may reach an unacceptable range when another system metric, such as system load, reaches a given point. Step 730 may identify a variety of unacceptable system operation ranges for each pair of metrics modeled, and may further identify unacceptable operation ranges for more than one pair of metrics. For example, varying degrees of unacceptable system response time may be identified. The degree to which each identified range is unacceptable may increase, from a moderately unacceptable level that requires prompt attention to correct to a fully unacceptable response time which requires immediate corrective action.

In step 735 an optimal system operation range may be identified using the model constructed in modeling step 725. Methods such as those described above that maximize the distance between curved modeling to different metrics to as a function of load may be used to identify an optimal system operation range in step 735.

Alarm thresholds may be defined in step 740. The alarm thresholds defined in step 740 may be based upon one or more unacceptable system operation ranges identified in step 730 and/or an optimal system operation range identified in step 735. The alarms defined in step 740 may constitute varying degrees and may be based upon different metrics. For example, an alarm may be defined to trigger if system metrics leave the optimal system operation range defined in step 735. Such an alarm may be of a low level, given that the performance of the monitored system may be non-optimal but may remain entirely acceptable to users. A higher level of alarm may then issue if one or more system metric enters into an unacceptable system operation range. If varying degrees of unacceptable system operation ranges were identified in step 730, correspondingly differing alarms may be defined in step 740.

In step 745 alarms may be issued if alarm thresholds are met. Step 745 may operate based upon the alarm thresholds defined in step 740 and the system metrics collected in step 715. Alternatively, a system may periodically receive alarm thresholds defined in step 740 and may issue an alarm if the systems recorded metrics recorded in step 710 meet or exceed an alarm threshold.

Referring now to FIG. 8, an environment in which systems and methods in accordance with the present invention for monitoring and modeling system operation in a production environment is illustrated. A server 810 or other appropriate computing equipment may operate software implementing methods in accordance with the present invention. Any number of systems may be monitored and modeled in accordance with the present invention, including computer software operating on a first server 820, computer software operating on a second server 830 and computer software operating on a third server 840. Monitored systems in accordance with the present invention may be related, but need not be related. Monitored systems may include multiple systems that utilize a single server. Server 810 performing monitoring and modeling functions may connect to the servers for systems to be monitored and modeled through any networking means, such as through a local area network. Collected metrics from the monitored systems may be stored in databases 895. Databases 895 may comprise a single database or may comprise multiple databases. Databases 895 may be maintained upon server 810 or may be maintained external to server 810. Server 810 and the software implementing systems and methods in accordance with the present invention for monitoring and modeling systems may be accessed through client 815. Client 815 may be any device through which a system operator may access and/or manipulate the software in accordance with the present invention operating upon server 810 and/or the system metrics collected in accordance with the present invention. Client 815 may be a computer workstation, a desktop computer, a lap top personal computer, a PDA, mobile telephone, table personal computer, or any other computing device. Server 810 may also connect through any appropriate networking media to devices for use in issuing system performance alarms. For example, an alarm may be sent to a system administrator's computer 850 through e-mail, instant messaging, or other means. By way of further example, an alarm may be sent to a monitoring server 860 and placed in a queue for access by a system administrator. As a yet further example, an alarm may be transmitted to mobile phone 870 belonging to a system administrator by use of a recorded message, a short text message, or other means. As a further example, an audible alarm 880 may be used to audibly notify a system administrator or other personnel of the status of a monitored system.

Figure 9:
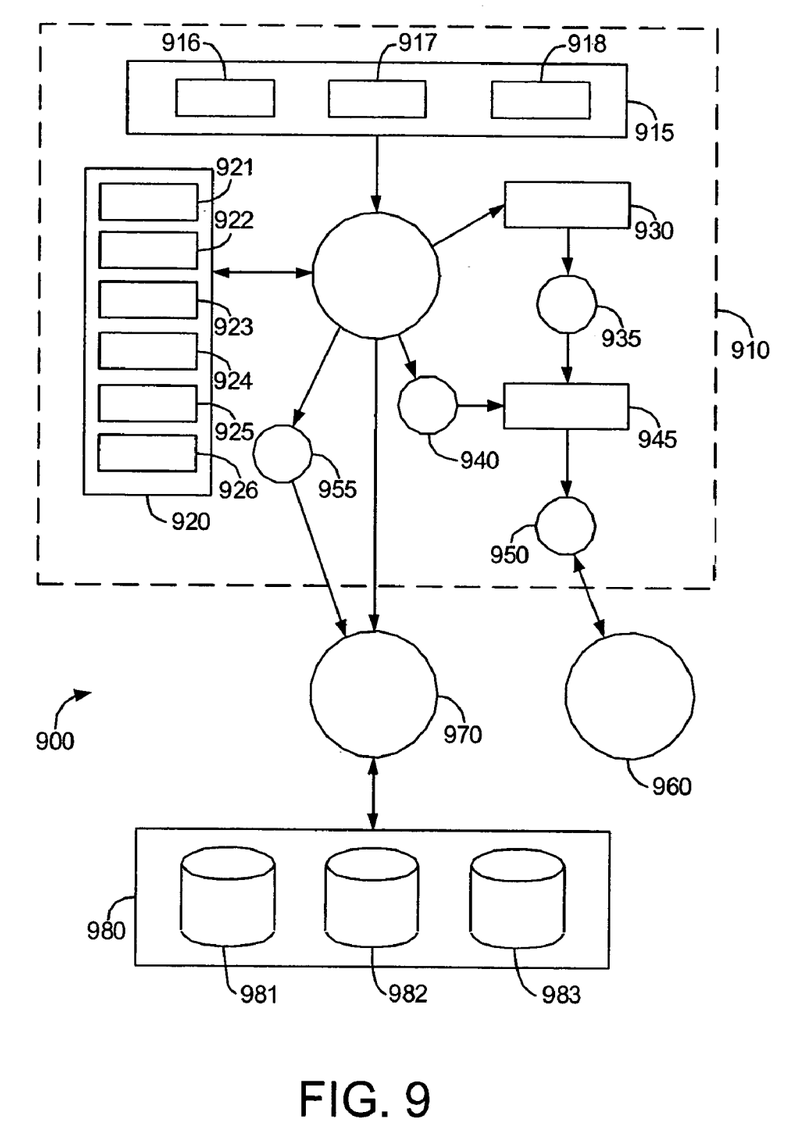
FIG. 9 illustrates a method in accordance with the present invention for collecting metrics in either a testing or production environment.

Referring now to FIG. 9, a system 900 for collecting system metrics is illustrated. While systems in accordance with the present invention, such as system 900, may operate with any commercially available system monitoring software, or may further operation with specially developed system monitoring software, the example of system 900 illustrated in FIG. 9 is particularly adapted for use with commercially available monitoring software sold under the trademark MeasureWare. One skilled in the art will appreciate the modifications that could be made to system 900 to allow operation with other monitoring software.

System 900 includes component 910. Component 910 includes a log adaptor 912. Log adaptor 912 may operate on a server on other computing device and may execute process in accordance with software implementing the methods of the present invention. Log adapter 912 may relay upon manually created configuration files 915 in operation. Manually generated files 915 may include a DSI configuration file 916. The DSI configuration file 916 may comprise lines describing the type-delimited metrics to collect, the type-delimited metric format, the path to the log set, the value at which to trigger an alarm or a metric (which may be left blank to turn of alarming), the application name, the application designation, the open view OPC message group, to indicate whether DSI logging is on or off, and settings for specific files such as the maximum indexes per record per hour per summarization or per retention. Manually generated files 915 may further comprise an IDS configuration file 916 to set to initial type-delimited values, the first being the starting transaction ID number and the second being the starting metric ID number to use when generating new specification files. Manually generated files may further include the OBCA client configuration file 918.

Automatically generated files 920 may also be part of system 910. Automatically generated files 920 may include a class configuration file 921 that contains one line per transaction with the short transaction name from the transaction configuration file 922. Transaction configuration file 922 may be a translation file to accommodate the 18-character limit in MeasureWare log file set names. Each line of the translation configuration file 922 may contain one line per transaction that has two values that are type-delimited. The first value may be a potentially shortened value of the full transaction name that is within the 18-character maximum followed by the full transaction name. The long name of a transaction may be the name actually used for a log file, with the short name being used in the class configuration file 921 for use by MeasureWare. The time threshold configuration file 923 may hold the average service time threshold violation values per transaction for levels of warnings such as minor, major, critical, or other levels desired by a user. An error threshold configuration file 924 may also be used, but may be omitted. A percent threshold configuration file 925 also may be optionally included. A previous alarm configuration file 926 may be included to maintain historical alarm information.

Log adapter 912 may receive manually generated files 915 and may operate in the generation of automatically generated files 920.

One skilled in the art will appreciate that methods in accordance with the present invention may be implemented using computer software. Such software may take the form of computer readable code embodied on one or more computer readable media. Software implementing the present invention may operate independently, but may also be incorporated with system testing software or system monitoring software. Any software language may be used to implement methods in accordance with the present invention.

The invention claimed is:

1. A method for monitoring system performance, the method comprising:
   defining system metrics for a system to be monitored;
   measuring the defined system metrics using computer software operating on the system to be monitored further comprising measuring at a first set of predetermined intervals the defined system metrics using computer software operating on the system to be monitored;
   reporting the measured system metrics from the software operating on the system to be monitored to a central processing hub further comprising reporting at a second set of predetermined intervals the measured system metrics from the software operating on the system to be monitored to the central processing hub;
   storing the measured system metrics to a database at the central processing hub; and
   identifying correlations between different measured system metrics stored in the database.

2. The method for monitoring system performance of claim 1, wherein:
   the first set of predetermined intervals comprises a single first predetermined interval; and
   the second set of predetermined intervals comprises a single second predetermined interval.

3. The method for monitoring system performance of claim 2, wherein the single first predetermined interval is shorter than the single second predetermined interval.

4. The method for monitoring system performance of claim 1, wherein identifying correlations between different measured system metrics further comprises identifying non-linear correlations between pairs of measured system metrics.

5. The method for monitoring system performance of claim 3, wherein identifying correlations between different measured system metrics further comprises identifying non-linear correlations between pairs of measured system metrics.

6. At least one computer readable media having embodied thereon computer readable instructions for causing at least one computer to perform a method for monitoring system performance, the method comprising:
   receiving definitions of system metrics for a system to be monitored;
   measuring the defined system metrics using computer software operating on the system to be monitored further comprising measuring at a first set of predetermined intervals the defined system metrics using computer software operating on the system to be monitored;
   reporting the measured system metrics from the software operating on the system to be monitored to a central processing hub further comprising reporting at a second set of predetermined intervals the measured system metrics from the software operating on the system to be monitored to the central processing hub;
   storing the measured system metrics to a database at the central processing hub; and
   identifying correlations between different measured system metrics stored in the database.

7. The at least one computer readable media of claim 6, wherein:
   the first set of predetermined intervals comprises a single first predetermined interval; and
   the second set of predetermined intervals comprises a single second predetermined interval.

8. The at least one computer readable media of claim 7, wherein the single first predetermined interval is shorter than the single second predetermined interval.

9. The at least one computer readable media of claim 6, wherein identifying correlations between different measured system metrics further comprises identifying non-linear correlations between pairs of measured system metrics.

10. The at least one computer readable media of claim 8, wherein identifying correlations between different measured system metrics further comprises identifying non-linear correlations between pairs of measured system metrics.

* * * * *